United States Patent
Schmitt et al.

(10) Patent No.: US 7,051,453 B2
(45) Date of Patent: May 30, 2006

(54) PARTICULATE TRAP CLEANING SYSTEM

(75) Inventors: William Raphael Schmitt, Los Angeles, CA (US); Cary M. Ellsworth, Rialto, CA (US); Ben Richard Baca, Valley Glen, CA (US); Michael Angel De Leon, Chino, CA (US); Brian Patrick Cunningham, Downey, CA (US); Leonard Seymour Walker, Inglewood, CA (US)

(73) Assignee: City of Los Angeles, Los Angeles, CA (US)

( * ) Notice: Subject to any disclaimer, the term of this patent is extended or adjusted under 35 U.S.C. 154(b) by 0 days.

(21) Appl. No.: 10/745,782

(22) Filed: Dec. 23, 2003

(65) Prior Publication Data

US 2005/0132595 A1 Jun. 23, 2005

(51) Int. Cl.
*F26B 7/00* (2006.01)
(52) U.S. Cl. .................. 34/381; 34/82; 34/84; 34/85
(58) Field of Classification Search .................. 34/80, 34/82, 84, 85, 381; 99/468; 55/380; 95/217; 96/247
See application file for complete search history.

(56) References Cited

U.S. PATENT DOCUMENTS

| | | | | |
|---|---|---|---|---|
| 4,827,561 A | * | 5/1989 | Lamore | 15/327.1 |
| 4,838,907 A | * | 6/1989 | Perry | 55/381 |
| 4,987,738 A | * | 1/1991 | Lopez-Crevillen et al. | 60/286 |
| 5,290,330 A | * | 3/1994 | Tepper et al. | 96/381 |

* cited by examiner

*Primary Examiner*—S. Gravini
(74) *Attorney, Agent, or Firm*—Greenberg Traurig LLP

(57) ABSTRACT

A system for cleaning a particulate trap comprises locating the trap in a chamber and forcing cleaning air through the trap. The air and removed particulates is extracted from the trap towards a filter. The expelled air essentially without the removed particulates from the chamber, the removed particulates being essentially trapped in the filter. The trap is locatable about a longitudinal axis such that air is urged in a longitudinal direction through the trap. The trap is supportable on at least one rotatable roller to affect rotation about the axis. A motor and blower draws air from the chamber and an air pressure differential about the filter causes the particulate to be directed through the filter and excess air is pumped out of the blower by the motor operating the blower.

14 Claims, 4 Drawing Sheets

PARTICULATE TRAP CLEANING SYSTEM

BACKGROUND

This invention relates to cleaning a particulate trap. In particular the invention is concerned with cleaning such traps where such traps are usually employed with a diesel engine.

Different techniques are known for cleaning a trap of a diesel engine. Invariably these systems are relatively expensive and complex to use.

A purpose of the present invention is to provide a user-friendly system for cleaning particulate traps which is relatively simple in operation and inexpensive in application.

SUMMARY

A system and method for cleaning particular traps comprises locating a trap in a chamber and forcing cleansing air through the trap. Air is extracted from the chamber and particulates are removed from the air stream by filtering. Excess air from the chamber is expelled through a blower.

The trap is strategically located in the chamber about a longitudinal axis and air nozzles are directed to force air through the trap. This air is expelled from the opposite side of the trap together with particulate material which is then sucked towards the blower region through the action of the pump activating the blower.

The particulates from the chamber are directed through a filter such that the particulate material is directed in a first direction to a filter medium. The excess air is directed in a second direction to be expelled through the blower.

Air enters the chamber through an inlet pipe that supplies shop air at about 120 to 130 lb. The pressure outlet from the blower is about 500 ft. per minute, the pressure action on the filter medium is about 750 ft. per minute. This effects a pressure differential to cause particulates to be directed to the filter medium, while excess air is expelled from the blower.

The cleaning process, apparatus and system provides for an enhanced and effective cleaning of the trap.

The invention is now further described with reference to the accompanying drawings.

DRAWINGS

Figure 2:
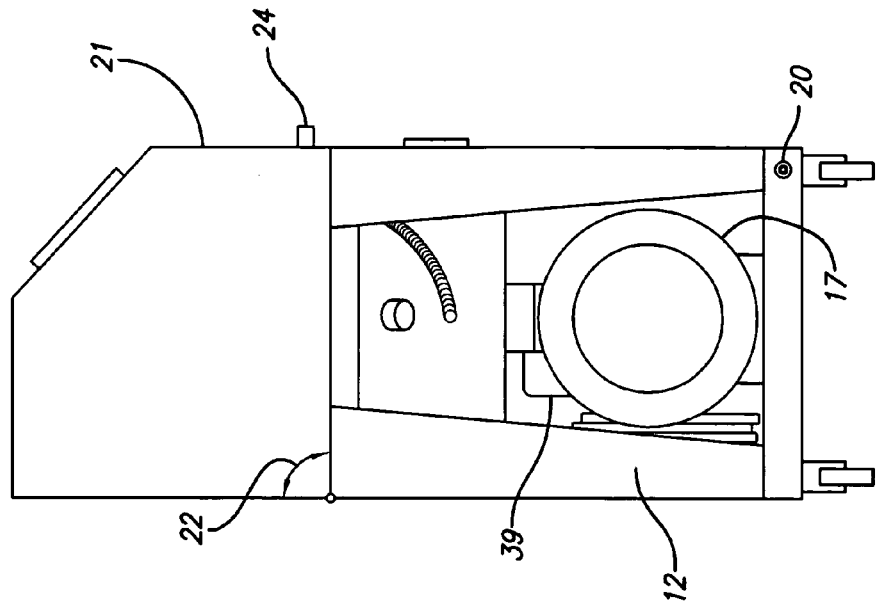
FIG. 2 is a side view of the system showing the chamber located above the filter.
Figure 1:
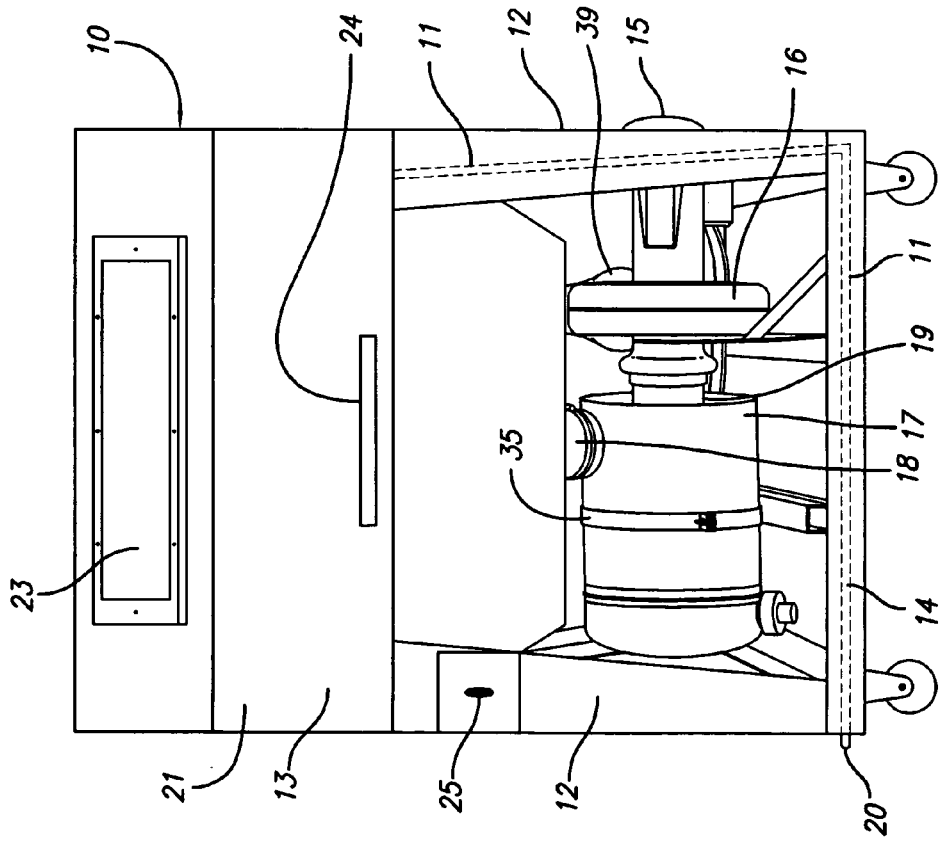
FIG. 1 is a front view of the apparatus for cleaning a trap and shows the chamber, a motor blower and filter mounted on the apparatus below the chamber.
Figure 3:
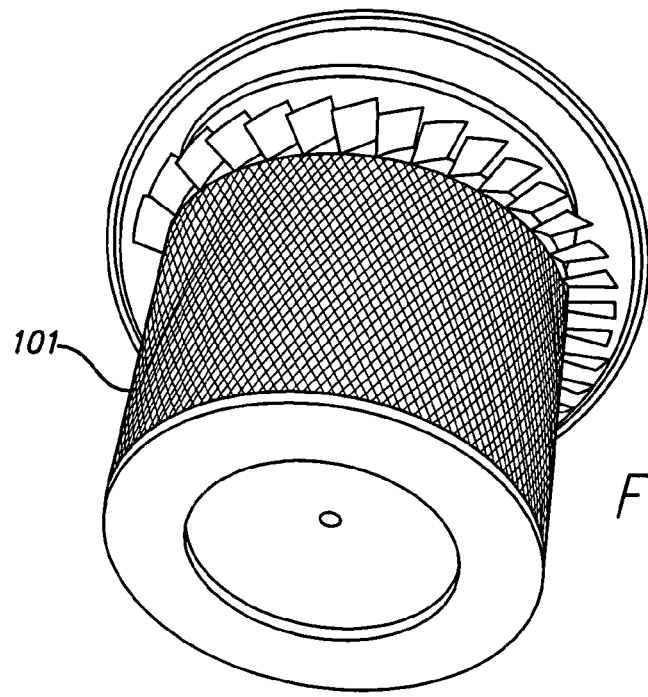
FIG. 3 is a typical filter cartridge for use in the filter unit.
Figure 4:
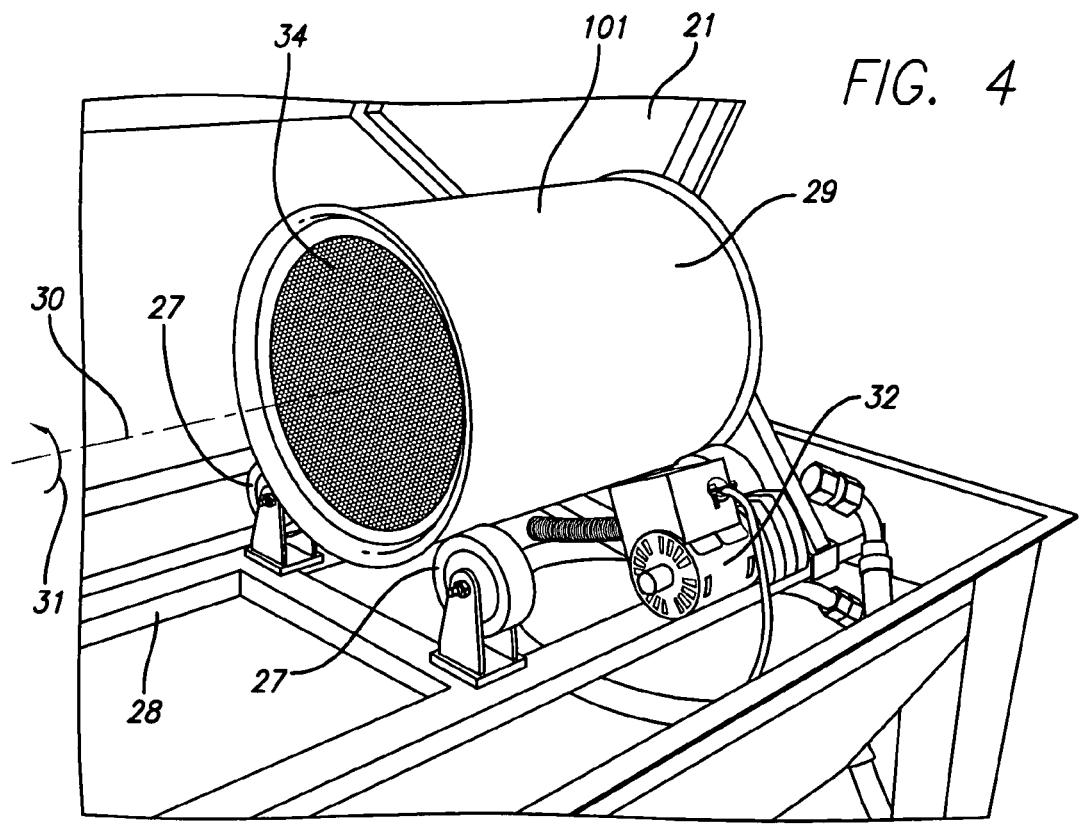
FIG. 4 is a perspective view showing a trap, with the welding beads removed, located on rollers in the chamber. The door to the chamber is open.
Figure 5:
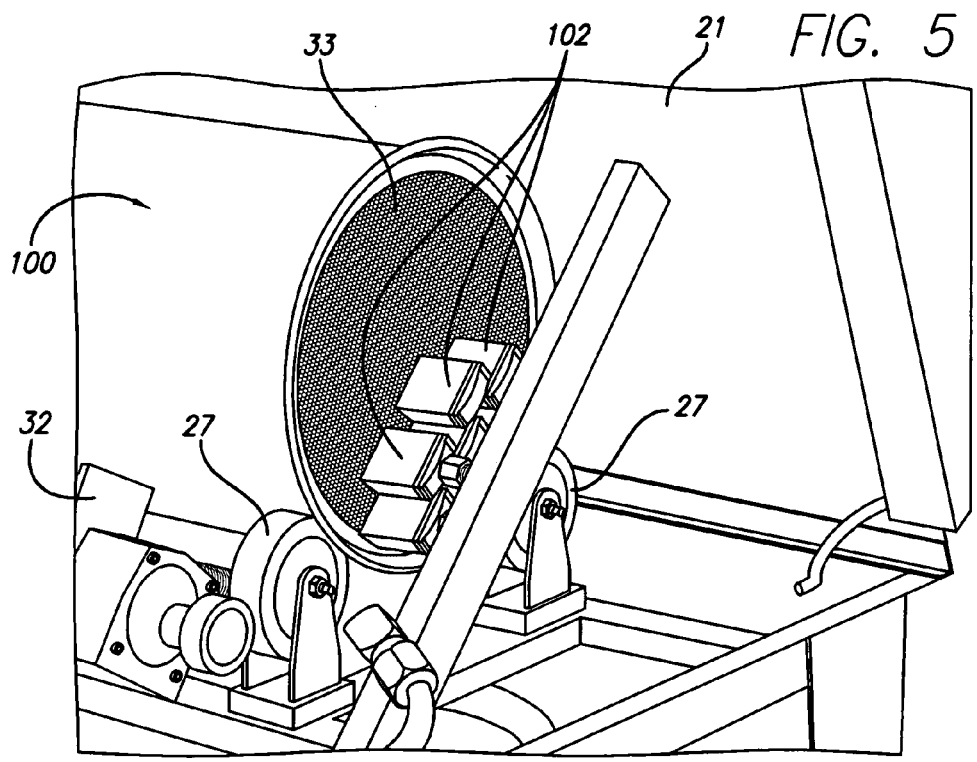

FIG. 5 is a different perspective view showing the trap on the rollers. The nozzles are directed towards one end of the trap. The door to the chamber is open.

Figure 6:
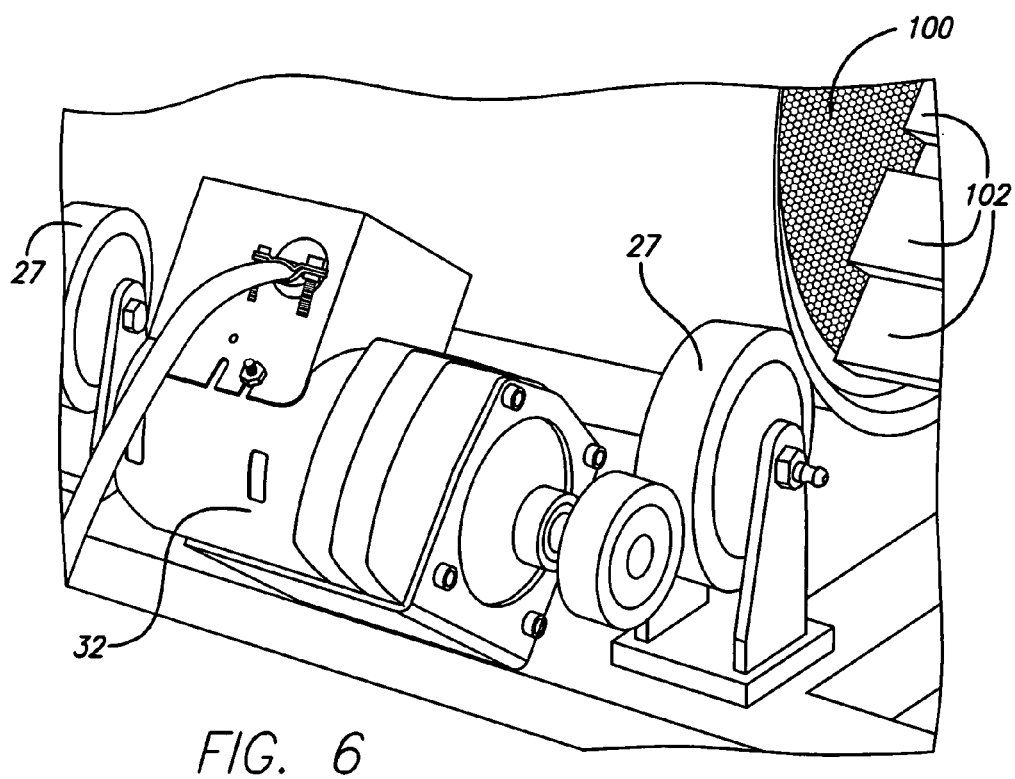

FIG. 6 is a different perspective view showing the rollers engaging with the perimeter casing of the trap.

Figure 7:
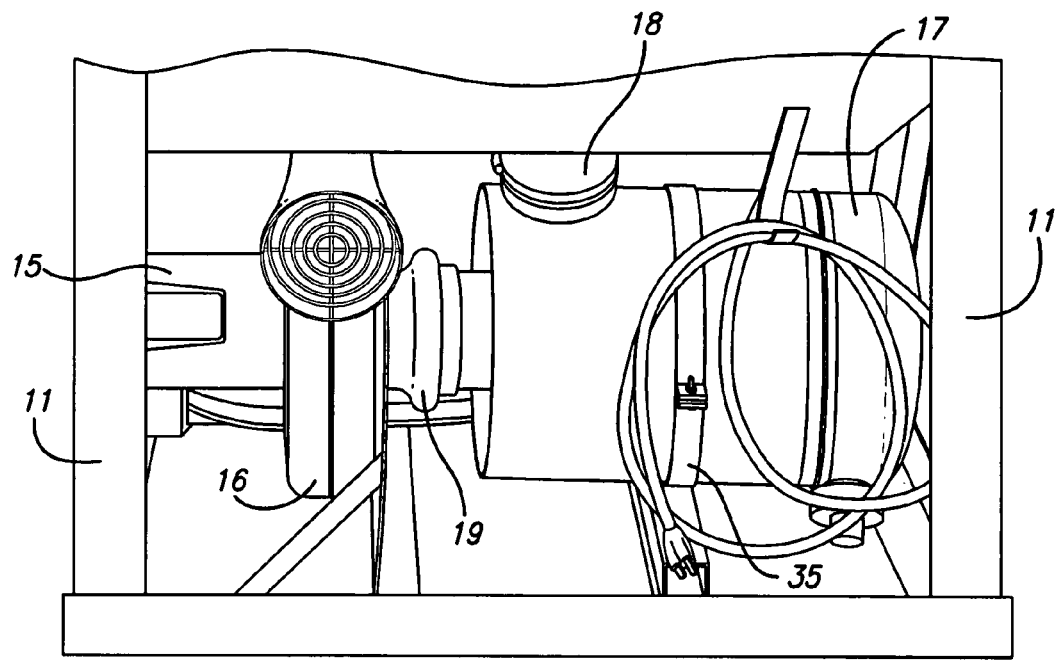

FIG. 7 is a detailed view of the filter, motor, and blower mounted below the chamber.

Figure 8:
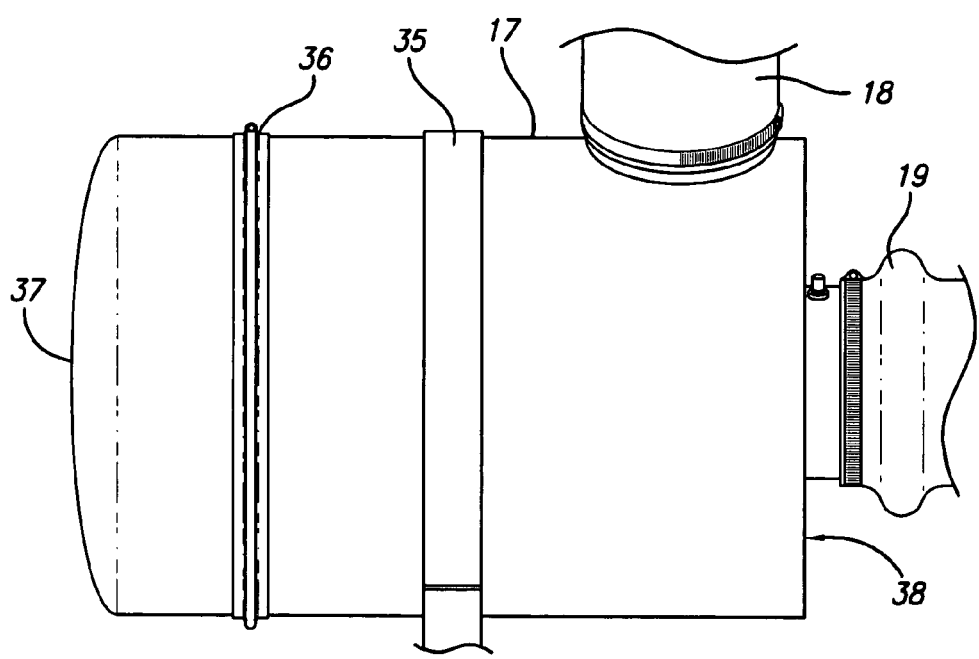

FIG. 8 is a further view of the filter, and the conduit into the filter from the chamber, and the outlet conduit from the filter to the blower.

DESCRIPTION

A system for cleaning a particulate trap comprises locating the trap in a chamber. Cleaning air is forced through the trap. Air is extracted with removed particulates from the trap, and these are directed towards a filter. Expelled air, essentially without the removed particulates from the chamber is expelled from the blower. The removed particulates are essentially trapped in the filter.

The chamber is located on a base, which is below the chamber. There is a support on the base for the blower, filter and motor. There is an air connection between the chamber so that shop air can be pumped and/or forced into the chamber. The air is directed from the air inlet to the chamber and out to the blower and filter, such that a particulate trap located in the chamber is cleaned of particulate.

The trap is locatable about a longitudinal axis such that cleaning air is urged in a longitudinal direction through the trap. The trap is supportable on several ratable rollers to affect rotation about the axis. The rotational rollers engage an outside perimeter casing for the trap, and the perimeter casing is substantially circular. As such, the air is directed substantially axially through the trap.

The chamber can be opened and closed with a door. There is an inlet for air to the chamber and an outlet for air and removed particulates from the chamber.

An air supply pumps air into the chamber under a positive pressure. There is a motor and blower for drawing air from the chamber. An air pressure differential is caused in an area adjacent to the filter. The particulates from the trap are directed through the filter and excess air is pumped out of the blower by the motor operating the blower.

Multiple nozzles in the chamber direct the pressurized air through the multiple nozzles at a pressure of about 120–130 lb./in and the pump pressure from the chamber is such that the rate of air flow to the blower is about 500 ft.

The trap is the device normally associated with a diesel engine outlet. The trap is located in the chamber on rollers such that the airflow through the trap is at least in a direction opposite to the normal flow of air through the trap when located in an operable position with an engine. After a first cleaning cycle in that direction, the trap is located in the opposite position on the rollers and cleaning air is forced through the trap in the direction which is normal for the trap when in use with an engine.

The motor forces the blower to blow air out of the blower. A negative pressure is created in the air connection from the chamber and the pressure differential forces particulates from the air stream coming out of the chamber through a filter. The particulates are separable from the air from the chamber, and the air essentially without particulate is expelled from the blower.

An apparatus for cleaning a trap 100 of particulates includes a series of four spaced rollers 27 which are mounted in a chamber 13. The chamber is mounted on top of the legs 12. The legs 12 form a support for the chamber 13. Between the legs 12 there is mounted a motor 15 which is connected with the blower 16 which in turn is connected with a filter unit 17.

An outlet 18 from the chamber 13 is directed into the filter unit 17. An outlet 19 from the filter unit 17 is directed to the blower 16. The filter 17 is provided with a filtration unit 101.

An inlet for shop air 20 is provided at the base of one of the legs 12 and the shop air is directed through a pipe 11 into the chamber 13. The chamber 13 includes a hinged door 21 which can be opened and closed as indicated by arrow 22.

There is a window 23 provided to the door 21 and a handle 24 facilitates opening and closure of the door 21 to the chamber 13 as required.

The trap 101 has the welding beads removed from both ends of the trap 101. The door 21 of the chamber is opened and the trap 101 is located on the series of four rollers 27 which are spaced on a substrate base 28 to engage the peripheral circumferential surface 29 of the trap 101. In this manner the trap 101 can be rotated about the axial axis 30 as indicated by arrow 31.

A motor 32 is powered to activate the rotation of the rollers 27 and in turn cause the rotation of the trap 101 about the axis 30. Rotation is effected when the door 21 is closed. A timer 25 is provided for permitting operation of the apparatus for the cleaning cycles of a trap 100. The motor 15 is plugged in to a 120 Volt supply. Air supply is applied through the air inlet 20 and pipe 11 for a predetermined length of time. The timer operates for 10 minutes. Air nozzles 102 are arranged so that they are in close proximity to the element 33 of the trap 101. This forces air in the direction through the element 33 and exits through the element 34 on the opposite side of the particular trap 101. Nozzles 32 do not touch against the surface 33. The nozzles 32 are in as close a proximity as feasible.

After the door 21 is closed, the timer 25 is set for 15 minutes. The trap 101 is cleaned by forcing air in the direction of element 33 to element 34. After that process is effected, the trap 101 is cleansed by forcing the air from the direction of element 34 to element 33. In this operation the trap 101 is turned on its axis so that the surface 34 is closest to the nozzles 32. The second cleansing along axis 30 is from the direction of element 34 which is adjacent to the nozzles 32. This is also timed for 10 minutes. It may be less, for instance, about 20 minutes.

After the trap 101 is cleaned, it is removed from the apparatus. It is installed on a truck with the reverse side of the trap 101, in the line.

The filter 101 is removed and replaced with a new filter 101. The end nozzles 32 can be cleaned with a small wire or wire brush has needed.

The filter unit 17 is secured by tightening straps 35 which surrounds circumference of the filter unit 17. The opening of the filter unit 17 can be effected through the releasing seal 36 at the end 37 of the filter. This gives access to the filter cartridge 101. The inlet conduit 18 is directed to the filter 17 in an area near the end 38 of the filter unit 17. The outlet conduit 19 from the filter 17 is directed from the end 38.

The outlet conduit 19 is connected with the blower unit 16, which is operated by the motor 15. The outlet 39 of blower 16 is a tangential outlet from the blower 16 and expels cleansed air, ideally to the rear of the cleaning apparatus.

The air pressure is such that the inlet air pressure is about 120–130 lb. of shop air. The outlet from the chamber 13 to the inlet 18 of the filter unit 17 is such that the air entering the filter unit 17 is drawn to the blower at a flow rate of about 500 ft. per minute. This creates a differential since the flow rate towards the filter is about 750 ft. per minute. This brings the particulates to the elements in the filter 101. Air is expelled from the blower at about 500 ft. per minute.

Many other forms of the invention exist each differing from the other in matters of detail only. The scope of the invention is to be determined solely by the following claims.

The invention claimed is:

1. A system for cleaning a particulate trap comprising:
   locating the trap in a chamber, said trap locatable about a longitudinal axis;
   supporting said trap on at least one rotatable roller wherein said rotational roller engages an outside perimeter casing of the trap so as to affect said trap's rotation about said axis;
   forcing cleaning air through the trap;
   extracting the air and removed particulates from the trap towards a filter; and
   expelling air essentially without the removed particulates from the chamber, the removed particulates being essentially trapped in the filter.

2. A system as claimed in claim 1 wherein in the trap is locatable about a longitudinal axis such that air is urged in a longitudinal direction through the trap.

3. A system as claimed in claim 2 wherein said at least one rotatable roller affects rotation of the trap about its axis.

4. A system as claimed in claim 3 wherein the perimeter casing been substantially circular, and wherein the air is directed substantially axially through the trap.

5. A system as claimed in claim 1 wherein the chamber is closable about the trap and there is an inlet for air to the chamber and an outlet for air and removed particulates from the chamber.

6. A system as claimed in claim 1 including a motor and blower for drawing air from the chamber, and wherein an air pressure differential is caused in an area about the filter such that particulates are directed to the filter and excess air is pumped out of the blower by the motor operating the blower.

7. A system as claimed in claim 1 including an air supply to pump air into the chamber under a positive pressure.

8. A system as claimed in claim 7 including multiple nozzles in the chamber for directing the pressurized air through the multiple nozzles at a pressure of about 120 lb./in2 to 130 lb./in2, and the pump flow from the chamber is at about 450 CFM.

9. A system has claimed in claim 1 wherein the trap is the device normally associated with a diesel engine outlet.

10. A system as claimed in claim 1 wherein said roller engages said trap such that airflow through the trap is possible at least in a direction opposite to the normal flow of air through the trap in an operable position wit an engine.

11. A system for cleaning a particulate trap comprising:
    a chamber located on a base;
    a trap supportable by at least one rotatable roller located within the chamber, said trap locatable about a longitudinal axis; wherein said rotational roller engages an outside perimeter casing of the trap so as to affect said trap's rotation about said axis;
    the base being below the chamber;
    a support on the base for a blower, a filter and a motor;
    an air connection between the chamber, the filter and the blower;
    an air inlet to the chamber; and
    the air being directed from the air inlet to the chamber and out to the blower and filter, such tat a particulate trap located in the chamber is cleaned of particulate.

12. A system as claimed in claim 11 wherein the motor blows air through the blower and causes a negative pressure in the air connection from the chamber, and wherein a pressure differential forces particulates to a filter such that the particulates are separated from the air from the chamber, and wherein air essentially without particulates are expelled from the blower.

13. A system for cleaning a particulate trap comprising:

locating the trap in a chamber, said tap locatable about a longitudinal axis supporting said trap on at least one rotatable roller so as to affect said trap's rotation about said axis;

forcing cleaning air through the trap;

extracting the air and removed particulates from the trap towards a filter;

directing particulates through said filter in a first direction;

directing excess aid in a second direction towards a blower; and wherein said blower expels air essentially without the removed particulates from the chamber, the removed particulates being essentially trapped in the filter.

14. A system as claimed in claim 13 wherein the rotatable roller engages an outside perimeter casing for the trap, the perimeter casing been substantially circular, and wherein the air is directed substantially axially through the trap.

* * * * *